United States Patent Office 3,792,008
Patented Feb. 12, 1974

3,792,008
CURABLE ORGANOPOLYSILOXANES
Charles George Neuroth, Blissfield, Mich., assignor to Stauffer Chemical Company
No Drawing. Filed Feb. 10, 1972, Ser. No. 225,295
Int. Cl. C08g 51/34, 51/50
U.S. Cl. 260—30.6 SB
14 Claims

ABSTRACT OF THE DISCLOSURE

An organopolysiloxane composition having improved flow characteristics which comprises an hydroxyl-terminated organopolysiloxane, cross-linking agents containing an organohydrogenpolysiloxane and an organosilicon compound of the general formula $R'_mSi(OR)_{4-m}$ in which R is a hydrocarbon radical having from 1 to 10 carbon atoms, R' is a monovalent hydrocarbon radical or a halogenated monovalent hydrocarbon radical having up to 10 carbon atoms and $m$ is a number greater than 0 and up to 3, an organotin catalyst and an additive which reduces the viscosity of the composition. These compositions are useful in the preparation of molds where flow properties are essential and upon vulcanization will provide an elastomeric material having improved elongation and tear strength.

---

The present invention relates to organopolysiloxanes, particularly curable organopolysiloxanes having improved flow characteristics and improved physical properties and more particularly to curable organopolysiloxane compositions which utilize a novel curing system.

Although various organopolysiloxane compositions were found to be desirable for many industrial applications they were found to be undesirable in making molds for the furniture industry where minute details are essential. Because of their flow characteristics, the organopolysiloxane compositions used heretofore did not flow evenly into narrow spaces and crevices in order to make the detailed patterns which are essential in the furniture industry. However, when these compositions were modified either by reducing the viscosity of the polymer or by reducing the amount of reinforcing fillers, the resulting compositions did not possess the necessary physical properties which are essential in making molds. Thus, in order to provide suitable mold compositions for the furniture industry, it was found necessary to alter the curing systems and to add a viscosity reducing agent in order to produce compositions having the necessary flow properties and the desired physical properties such as elongation and tear strength.

Therefore, it is an object of this invention to provide a curable organopolysiloxane composition. Another object of this invention is to provide a curable composition which utilizes a novel curing system. Still another object of this invention is to provide a curable organopolysiloxane composition having improved flow properties. A further object of this invention is to provide a silicone elastomer having improved resistance to tear. Still a further object of this invention is to provide a silicone elastomer which will resist tear propagation.

The foregoing objects and others which will become apparent in the following description are accomplished in accordance with this invention, generally speaking, by providing a curable organopolysiloxane composition which comprises mixing an hydroxyl-terminated organopolysiloxane with cross-linking agents containing an organohydrogenpolysiloxane and an organosilicon compound containing hydrocarbonoxy groups, an organotin catalyst and an additive which reduces the viscosity of the composition.

More specifically, the invention relates to a room-temperature-curable organopolysiloxane composition which comprises mixing together an organopolysiloxane having a viscosity of at least about 500 cs. at 25° C. and containing silicon-bonded hydroxyl groups with a mixture of cross-linking agents containing either an organosilicon compound of the general formula $R'_mSi(OR)_{4-m}$ or the corresponding siloxanes in which R is a hydrocarbon radical having from 1 to 10 carbon atoms, R' represents a hydrocarbon radical or a halogenated derivative thereof having up to 10 carbon atoms and an organohydrogenpolysiloxane of the general formula

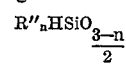

wherein R" represents a monovalent hydrocarbon radical, halogenated monovalent hydrocarbon radical or a cyanoalkyl radical having up to 18 carbon atoms, $m$ is a number greater than 0 and up to 3, $n$ is a number greater than 0 but less than 2, in the presence of an organotin catalyst and a viscosity reducing agent.

Specific examples of R groups which are operative in this invention are alkyl radicals such as methyl, ethyl, propyl, butyl, hexyl, octyl and decyl and aryl radicals such as phenyl and the like. The radicals represented by R' are alkyl radicals such as methyl, ethyl, propyl, butyl, hexyl, octyl and decyl; aryl radicals such as phenyl; aralkyl radicals such as benzyl; alkaryl radicals such as tolyl, xylyl; halogenated hydrocarbon radicals such as chloromethyl, bromoethyl, tetrafluoroethyl, fluoroethyl, trifluorotolyl, hexafluoroxylyl, and the like.

The organohydrogenpolysiloxanes may be further represented by the general formula

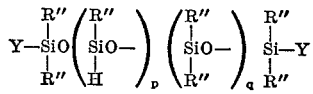

in which R" is the same as above, Y may be R, OH or OR, $p$ is a number of at least 10 and $q$ may be a number less than, equal to, or greater than $p$. Generally, the ratio of $p$ to $q$ is in the range of from 1:0 to 1:5.

Examples of suitable organosilicon compounds are ethyltrimethoxysilane, methylbutoxydiethoxysilane, propyltripropoxysilane, methyltriethoxysilane, ethyltriethoxysilane, phenyltriethoxysilane, phenyltributoxysilane, diphenyldiethoxysilane, propyltrimethoxysilane, hexyltrimethoxysilane, octyltrimethoxysilane, propyltributoxysilane and mixtures thereof.

The hydroxyl-terminated organopolysiloxanes may be represented by the general formula:

$$HO—Q—H$$

wherein Q represents

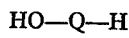

or a modified siloxane of the formula:

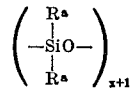

wherein $R^a$, which may be the same or different, represents monovalent hydrocarbon radicals, halogenated monovalent hydocarbon radicals, or cyanoalkyl radicals; $R^b$ is a divalent hydrocarbon radical; $R^c$ is a polymeric organic radical linked to $R^b$ by a carbon-to-carbon linkage; $x$ is a number of from 0 to 20,000 and $y$ is a number of from 1 to 500.

In the above formula, $R^a$ is an organic group selected from the class consisting of alkyl radicals having from 1 to 18 carbon atoms, such as methyl, ethyl, butyl, hexyl, octyl, octadecyl; aryl radicals, such as phenyl, diphenyl, and the like; alkaryl radicals, such as tolyl, xylyl, ethylphenyl, and the like; aralkyl radicals, such as benzyl, phenethyl, and the like; haloaryl radicals, such as chlorophenyl, tetrachlorophenyl, difluorophenyl, and the like. $R^b$ is a divalent hydrocarbon radical having from 1 to 6 carbon atoms, such as ethylene, trimethylene, tetramethylene, hexamethylene, and the like. $R^c$ is a polymer or copolymer linked to the organopolysiloxane through a carbon-to-carbon linkage with a divalent hydrocarbon radical represented by $R^b$ above.

The hydroxyl-terminated organopolysiloxane fluids used in the preparation of the modified organopolysiloxanes are further characterized by viscosities at 25° C. of from about 100 cs. up to about 100,000 cs. and preferably in the range of from about 1,000 to 50,000 cs. Such organopolysiloxanes are further characterized by an organic group, preferably an alkyl to silicon atom ratio of from about 1.9:1 to 2:1 and having one hydroxyl group bonded to each of the terminal silicon atoms of the polymer chain.

These modified organopolysiloxanes are prepared by abstracting hydrogen from a silicone polymer in the presence of a free-radical initiator to form an active site for grafting an organic polymer thereto.

The term "modified organopolysiloxane" is meant to include compositions containing an organopolysiloxane (silicone) polymer and an organic polymer in which part or all of the organic polymer is connected to the silicone polymer by a carbon-to-carbon linkage.

Any silicone polymer may be used in this invention since these polymers are apparently capable of producing some free radicals or active sites under the proper conditions. Thus, the silicone polymer should be one which is capable of producing a substantial or recognizable number of free radicals and it should be substantially free of any tendency to undergo further polymerization under the conditions employed. Preferably, the silicone polymer has lower alkyl radicals attached to the silicon atoms since these are more amenable to hydrogen abstraction than other radicals.

Examples of suitable silicone polymers and copolymers which may be used in the formation of the modified organopolysiloxanes are hydroxyl-terminated siloxane fluids such as dimethyl fluids, methylphenyl fluids, copolymers of dimethyl siloxane and phenylmethyl- or diphenylsiloxane units.

Any polymerizable organic monomer having aliphatic olefinic bonds may be grafted to the silicone polymer. Examples of suitable olefinic compounds are low molecular weight straight-chained hydrocarbons, such as ethylene, propylene, butylene; vinyl halides, such as vinyl chloride, vinyl fluoride; vinyl esters of organic acids, such as vinyl acetate, styrene, ring-substituted styrenes; and other vinyl aromatics, such as vinyl pyridine and vinyl naphthylene; acrylic acid and derivatives of acrylic acid including the salts, esters, amides, and acrylonitrile; n-vinyl compounds, such as n-vinyl carbazole, n-vinyl pyrrolidone, and n-vinyl caprolactam and vinyl silicon compounds, such as vinyltriethoxysilane. Other monomers which may be used are disubstituted ethylene, including vinylidene fluoride, vinylidene chloride, vinylidene cyanide; methacrylic acid and compounds derived therefrom, such as the salts, esters, and amides, as well as methacrolein, methacrylonitrile, and the like. The monomers may be used singly or in combinations of two or three or even more.

The grafting is most expeditiously effected by using a free-radical initiator, normally organic peroxides, although other free-radical initiators, such as azo-compounds in which both the N atoms of the azo linkage are attached to a tertiary carbon atom and the remaining valences of the tertiary carbon atom are satisfied by nitrile, carboxyl, cycloalkylene, or alkyl radicals having from 1 to 18 carbon atoms, may be used. In addition to the above mentioned initiators, ionizing radiation may also be used to bring about the formation of free radicals.

Suitable examples of peroxides which are operative in this invention are hydroperoxides, such as t-butyl hydroperoxide, cumene hydroperoxide, decylene hydroperoxide; dialkyl peroxides, such as di-t-butyl and dicumyl hydroperoxide; cyclic peroxides, such as ascaridole and 1,5-dimethylhexane-1,5-peroxide and per-esters, such as t-butyl perbenzoate, t-butyl peroxyisopropyl carbonate and t-butyl peroctoate; ketone peroxides, such as acetone peroxide and cyclohexanone peroxide.

The amount of free-radical initiator employed is not critical thus, any amount capable of producing a perceptible degree of grafting is suitable. Generally, as little as 0.05 percent of the more active peroxide initiators based on the weight of the monomers is adequate in most cases. However, where it is desirable to increase the reaction rate, then as much as 3 percent or even more of the initiator may be used.

If desired, the unreacted monomers may be separated from the grafted product by any conventional technique known in the art, such as by distillation, solvent extraction or selective solvent fractionation.

The compositions of this invention are prepared by mixing the hydroxyl-terminated organopolysiloxane with cross-linking agents in the presence of an organotin catalyst, filler and a viscosity reducing agent.

The cross-linking agents of this invention consist of at least one organosilicon compound containing polyhydrocarbonoxy groups and an organohydrogenpolysiloxane. Generally, the organosilicon compound is present in an amount of from about 5 to 50 percent and more preferably from about 25 to 40 percent by weight and the organohydrogenpolysiloxane is present in an amount of from 95 to 50 percent and more preferably from 75 to 60 percent by weight based on the total weight of the cross-linking agents. Two or more of the organosilicon compounds may be used as cross-linking agents, if desired.

The amount of cross-linking agents employed in the organopolysiloxane composition is not critical; thus any amount capable of curing the composition within the desired peroid of time is suitable. Generally, the amount of cross-linking agents is below about 3.0 percent; however, the amount may range from about 1.0 percent to about 5.0 percent by weight and more preferably from about 1.5 to 3.0 percent by weight based on the weight of the hydroxyl-terminated organopolysiloxane.

Catalysts which may be employed are organotin compounds of the general formula

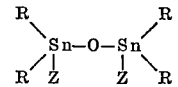

wherein R which may be the same or different represent hydrocarbon radicals having from 1 to 10 carbon atoms and Z is an acyloxy radical having from 2 to 18 carbon atoms. Examples of suitable monoacyloxy radicals of carboxylic acids are acetoxy, propionyloxy, valeryloxy, caproyloxy, myristoyloxy and stearoyloxy radicals.

Tin compounds embraced by the above formula are 1,1,3,3-tetramethyl-1,3-diacetoxydistannoxane;
1,1,3,3 tetra-i-propyl-1,3-diacetoxydistannoxane;
1,1,3,3-tetrahexyl-1,3-diacetoxydistannoxane;
1,1,3,3-tetraoctyl-1,3-diacetoxydistannoxane;
1,1,3,3-tetraphenyl-1,3-diacetoxydistannoxane;
1,1,3,3-tetraphenyl-1,3-dipropionyloxydistannoxane;
1,1,3,3-tetrahexyl-1,3-dipropionyloxydistannoxane;
1,1,3,3-tetrahexyl-1,3-dipropionyloxydistannoxane;
1,1,3,3-tetraoctyl-1,3-dipropionyloxydistannoxane;
1,1,3,3-tetraethyl-1,3-dicaproyloxydistannoxane;
1,1,3,3-tetraethyl-1,3-distearoyloxydistannoxane;
1,1,3,3-tetrabutyl-1,3-distearoyloxydistannoxane;
1,1,3,3-tetrahexyl-1,3-distearoyloxydistannoxane;
1,1,3,3-tetrabutyl-1,3-dilauroyloxydistannoxane and the like.

Other tin compounds which may be used as catalysts are dibutyltin butoxychloride and tin salts of carboxylic acids in which the acyloxy groups contain from 2 to 18 carbon atoms. Examples of suitable tin salts are dimethyltin diacetate, dibutyltin dilaurate, dimethyltin dioleate, dibutyltin distearate and the like.

The catalysts used in these curing system are effective in minimal amounts, e.g. from about 0.05 to about 2 percent, preferably from about 0.1 to about 1 percent by weight based on the weight of the hydroxyl-terminated organopolysiloxane. A mixture of two or more of the catalysts may be used, if desired.

The viscosity reducing agents of this invention are chemical compounds that contain both polar and non-polar moieties. The polar moiety comprises one or more groups which have an affinity for the inorganic fillers. It is believed that these agents interact with the surface of the fillers to displace the organopolysiloxanes, thereby reducing the thickening action or structure build-up which normally occurs when fillers interact with the organopolysiloxanes.

In general, nonionic compounds are preferred over ionic compounds because they are more easily dispersed in the organopolysiloxane. However, certain ionic compounds, such as long-chain organic acids containing at least 14 carbon atoms, may be used in the practice of this invention. Suitable salts include sodium, potassium, ammonium and substituted ammonium salts of carboxylic, sulfonic, sulfuric, phosphonic and phosphoric acids. Examples include sodium nonylbenzenesulfonate, sodium lauryl sulfate, triethanolammonium oleate, sodium dihexyl sulfosuccinate, and sodium capryl metaphosphate.

Preferred nonionic compounds generally include as the moiety a polyoxyalkylene chain, alone or in combination with one or more hydroxyl groups. This chain may be represented by the formula

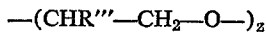

wherein $R'''$ is H or a lower alkyl group, preferably methyl, and $z$ is an integer of from 2 to 50, preferably from 4 to 20.

The nonpolar moiety consists of a paraffinic, monoolefinic, or siloxane chain. The paraffinic or monoolefinic chain should consist of at least 9 carbon atoms and the siloxane chain should consist of at least 9 units of the structure $-Si(CH_3)_2O-$. The polar and nonpolar moieties may be joined directly or through other atoms or groups by covalent bonds. The joining atoms or groups may be oxygen, methylene, carbonyl, arylene, carboxylate, phosphate, or other bivalent or tervalent organic or inorganic radicals. Generally, each molecule contains one polar and one nonpolar group; however, in some cases, two or more of each type may be present.

Examples of suitable compounds which may be employed as additives in this invention are monoalkyl and alkaryl ethers of polyalkylene glycols. These have the general formula:

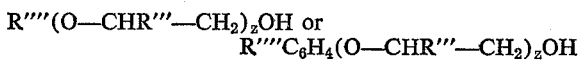

in which $R''''$ is an alkyl radical of from 4 to 22 carbon atoms and $R'''$ is hydrogen or a lower alkyl and $z$ is the same as above. If all of the $R'''$ groups are hydrogen, $R''''$ should have at least 9 carbon atoms. Examples include polyoxyethylene-polyoxypropylene monobutyl ether, polyoxyethylene (4) lauryl ether, polyoxyethylene (10) cetyl ether, polyoxyethylene (20) oleyl ether, poloxyethylene (10) nonylphenyl ether, and the like.

Other compounds are esters of polyalkylene glycols of the formula:

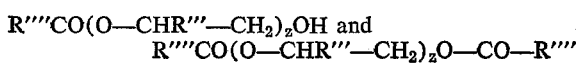

in which $R'''$, $R''''$ and $z$ are the same as above. Examples include polyoxyethylene mono- and dilaurate, mono- and distearate, mono- and dioleate, polyoxypropylene mono- and dilaurate, and the like.

Also polyol derivatives, which include poly(ethylene oxide) derivatives of mono- and diglycerides, poly(ethylene oxide) derivatives of sorbitan, methyl glucoside, pentaerythritol and other polyols partially esterified with long-chain fatty acids, e.g., polyoxyethylene sorbitan monooleate and the like may be used as viscosity reducing agents.

Other compounds which may be employed are phosphonates, which include polyalkylene glycol esters of long-chain alkanephosphonic acids, such as the bis-tetraethylene glycol ester of octadecanephosphonic acid and the like.

Polyether-siloxanes which include both hydrolyzable types, in which the polyether is bonded to silicon through a silicon-oxygen bond, and nonhydrolyzable types, in which the polyether is bonded through a carbon atom may be used as viscosity reducing agents. An example of the latter is the following compound:

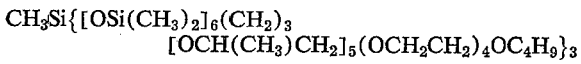

Generally the amount of additive used in these compositions is not critical; however, a sufficient amount should be incorporated therein to reduce the viscosity of the catalyzed and filled organopolysiloxane composition so that it will flow into the confined spaces of a flow measuring device within from about 5 to 30 minutes. Preferably the viscosity of the catalyzed organopolysiloxane composition ranges from about 400 to 20,000 cs. at 25° C. Obviously, the amount of additive is determined in part by the viscosity of the hydroxyl-terminated organopolysiloxane and the amount of fillers added. In general from about 0.05 to about 5 percent by weight and more preferably from about 0.2 to about 2 percent by weight based on the weight of the composition is necessary in order to provide the desired flow characteristics. If the amount of additive exceeds about 5 percent by weight, the physical properties such as elongation, tear strength and durometer are substantially reduced.

The flow properties are measured in a flow jig which consists of two convex plastic weighing dishes separated by a ¼ inch border so that a narrow confined area exists therebetween. The upper plastic dish contains a centrally located opening which is aligned with an opening in a reservoir connected thereto, thereby permitting the catalyzed composition to flow from the reservoir into the confined area between the convex plastic dishes. Each corner of the upper plastic dish also contains a vent opening which indicates when the confined area between the two plastic dishes is filled. The amount of catalyzed composition which flows into the confined area for a period of time up to 30 minutes is determined.

Various fillers may be incorporated in these compositions in order to impart desirable physical properties. Examples of such fillers are titanium dioxide, lithopone, zinc oxide, zirconium silicate, silica aerogel, iron oxide, diatomaceous earth, calcium carbonate, fumed silica, precipitated silica, and the like. The amount of filler used may also be varied within wide limits, for example from about 10 to about 300 percent by weight based on the hydroxyl-terminated organopolysiloxane. The exact amount of filler used will depend upon such factors as for example the application to which the organopolysiloxane is intended and the type of filler employed.

In order to prepare the composition herein described it is only necessary to mix the ingredients, preferably adding the organotin catalyst to a mixture containing the hydroxyl-terminated organopolysiloxane, filler, crosslinking agents and viscosity reducing agent. It is preferred that the organotin catalyst be added last, since shortly after the addition of this ingredient, the composition will begin to set-up in a matter of minutes and cure will begin to be observed within 1 to 2 hours at room temperature. The cured elastomeric silicone material thus obtained shows improved elongation and improved tear strength. Tear propagation under strain, which is usually observed with the conventional organopolysiloxane compositions known in the art, is substantially eliminated.

These compositions have many applications, for example, they may be used as sealants for joints between adjacent sections of highway, as insulation material for electrical components, gasket materials and for other applications for which known natural synthetic rubbers are unsuitable. These compositions are particularly suited for the preparation of molds in the furniture industry where it is desired to produce an article having detailed impressions. In addition these compositions show an excellent resistance to tear propagation, which is essential in the preparation of impression molds.

The embodiments of this invention are further illustrated by the following examples in which all parts are by weight unless otherwise specified.

EXAMPLE 1

A composition containing about 100 parts of an hydroxyl-terminated polydimethylsiloxane fluid (2000 cs. at 25° C.), about 23 parts "Celite" Super Floss (available from Johns Manville), about 40 parts of zirconium silicate, about 15 parts of zinc oxide, about 2 parts of methylhydrogenpolysiloxane fluid (available as Dow Corning 1107), about 0.125 part of diphenyldiethoxysilane and about 0.125 part of phenyltriethoxysilane is mixed and milled and thereafter heated for about 2 hours at a temperature of about 260° F. About 1.0 part of 1,1,3,3-tetrabutyl-1,3-dilauroyloxydistannoxane is added to the mixture and the flow property of the catalyzed composition measured in the flow jig described heretofore. The catalyzed composition filled about 10 percent of the confined area between the plastic dishes in a 30 minute period. The viscosity of the composition is about 36,000 cs. at 25° C.

The above composition is poured into a mold, allowed to cure for 7 days and the physical properties determined. The physical properties are illustrated in Table I.

EXAMPLE 2

The procedure described in Example 1 is repeated, except that 0.9 part of an alkylaryl polyether alcohol ("Triton" X-100, available from Rohm & Haas Company) is incorporated therein at room temperature with agitation, prior to the catalyst addition. The viscosity of the catalyzed composition is reduced from about 36,000 cs. to 16,100 cs. at 25° C. Physical properties of the cured composition are illustrated in Table I.

TABLE I

| Ex. No. | Tensile strength, p.s.i. | Elongation, percent | Tear strength, lbs./in. | Hardness Shore A | Trouser tear |
|---|---|---|---|---|---|
| 1 | 408 | 326 | 61 | 32 | 7 |
| 2 | 272 | 490 | 49 | 22 | 13 |

Trouser tear is determined in accordance with the procedure described in ASTM D-2262-64T.

EXAMPLE 3

The procedure described in Example 2 is repeated, except that 0.4 part of an alkylolamine salt of an unsaturated fatty acid (BYK-300, available from BYK-Gulden, Inc.) is substituted for "Triton" X-100. The viscosity of the resultant composition is 16,500.

EXAMPLE 4

The procedure described in Example 2 is repeated, except that 4000 cs. hydroxyl-terminated polydimethylsiloxane fluid is substituted for the 2000 cs. fluid and about 0.9 part of a non-hydrolyzable organo-silicon block copolymer (L-531, available from Union Carbide Corporation) is substituted for "Triton" X-100. The viscosity is reduced to about 16,500 cs. at 25° C. The composition filled the flow jig in about 22 minutes.

EXAMPLE 5

The procedure described in Example 4 is repeated except that about 0.6 part of dibutyltin butoxychloride is substituted for 1,1,3,3-tetrabutyl-1,3-dilauroyloxydistannoxane and 0.6 part of an alkylphosphonate ("Victawet" 12, available from Stauffer Chemical Company) is substituted for the L-531. The catalyzed composition filled the flow jig in about 11 minutes.

EXAMPLE 6

A composition containing about 100 parts of an hydroxyl-terminated polydimethylsiloxane fluid (4000 cs. at 25° C.), about 23 parts "Celite" Super Floss (available from Johns Manville), about 40 parts of zirconium silicate, about 15 parts of zinc oxide, about 2 parts of methylhydrogenpolysiloxane fluid (available as Dow Corning 1107), about 0.125 part of diphenyldiethoxysilane and about 0.125 part of phenyltriethoxysilane is mixed and milled and thereafter heated for about 2 hours at a temperature of about 260° F. About 0.6 part of dibutyltin butoxychloride is incorporated therein with agitation and the flow property of the catalyzed composition is determined in the flow jig. After about 30 minutes the catalyzed composition filled about 50 percent of the confined area in the flow jig.

EXAMPLE 7

The procedure described in Example 6 is repeated except that 0.2 part of butoxypolyoxyethylene polyoxypropylene glycol ("Ucon" 50-HB-260-X, available from Union Carbide Corporation) is incorporated therein with milling at room temperature prior to the catalyst addition. The composition filled the flow jig in about 15 minutes. Physical properties of the cured composition are illustrated in Table II.

EXAMPLE 8

The procedure described in Example 6 is repeated except that about 0.6 part of butoxypolyoxyethylene polyoxypropylene glycol ("Ucon" 50-HB-260-X) is incorporated therein with milling at room temperature prior to the catalyst addition. The resulting composition filled the flow jig in about 14 minutes. The physical properties of the cured composition are illustrated in Table II.

EXAMPLE 9

The procedure described in Example 6 is repeated except that 1.6 parts of butoxypolyoxyethylene polyoxypropylene glycol is added to the composition with milling at room temperature prior to the catalyst addition. The catalyzed composition filled the flow jig in about 11 minutes. The physical properties of the cured composition are illustrated in Table II.

TABLE II

| Ex. No. | Tensile strength, p.s.i. | Elongation, percent | Tear strength, lbs./in. | Hardness Shore A | Trouser tear |
|---|---|---|---|---|---|
| 7 | 326 | 409 | 44 | 30 | 10 |
| 8 | 322 | 432 | 43 | 28 | 12 |
| 9 | 303 | 450 | 45 | 26 | 14 |

The above table shows that the elongation and trouser tear of the cured organopolysiloxane composition are substantially increased by the addition of the viscosity reducing agent.

EXAMPLE 10

A composition containing about 100 parts of an hydroxyl-terminated polydimethylsiloxane fluid (4000 cs. at 25° C.), about 23 parts of "Celite" Super Floss, about 40 parts of zirconium silicate, about 15 parts of zinc oxide, about 2 parts of methylhydrogenpolysiloxane fluid, about 0.125 part of diphenyldiethoxysilane and 0.125 part of phenyltriethoxysilane is mixed and milled and thereafter heated for about 2 hours at a temperature of about 260° F.

A paste-type catalyst composition is prepared by adding 40 parts of calcium metasilicate, 5 parts of calcium carbonate and 3 parts of Victoria green to 100 parts of an hydroxyl-terminated polydimethylsiloxane fluid (2000 cs. at 25° C.) and mixed for about 15 minutes. About 3 parts of 1,1,3,3-tetramethyl - 1,3 - dioleoyloxydistannoxane is added to this mixture and milled for about 3 minutes.

About 10 parts of the above paste-catalyst is mixed with about 100 parts of the organopolysiloxane composition described above and then introduced into the flow jig. About 50 percent of the confined area in the flow jig is filled with the catalyzed composition in about 30 minutes.

EXAMPLE 11

The procedure described in Example 10 is repeated except that 0.2 part of butoxypolyoxyethylene polyoxypropylene glycol (("Ucon" 50–HB–260–X, available from Union Carbide Corporation) is incorporated in the organopolysiloxane composition with agitation at room temperature prior to the catalyst addition. The catalyzed composition filled the flow jig in about 15 minutes.

EXAMPLE 12

A composition containing about 100 parts of an hydroxyl-terminated polydimethylsiloxane fluid (2000 cs. at 25° C.), 77 parts of iron oxide and about 1 part of methylhydrogenpolysiloxane fluid (available as Dow Corning 1107) is mixed and milled and thereafter heated for 2 hours at about 180° F. About 0.4 part of polyoxyethylene (20) cetyl ether ("Brij" 56, available from Atlas Powder Co.) is mixed with the above composition and thereafter catalyzed with 0.3 part of dibutyltin butoxychloride. The physical properties of the cured composition are: tear strength 79 lb./in., tensile strength 650 p.s.i., elongation 387 percent and Shore A hardness 34.

EXAMPLE 13

In a comparison example, the procedure of Example 12 is repeated except that 0.75 part of methylhydrogenpolysiloxane (available as Dow Corning 1107) and 0.25 part of methyltriethoxysilane and phenyltriethoxysilane in a ratio of 1 part of methyltriethoxysilane to 2 parts phenyltriethoxysilane is added as the cross-linking agents. The properties of the cured composition are: tear strength 87 lb./in., tensile strength 764 p.s.i., elongation 401 percent and Shore A hardness 36.

EXAMPLE 14

A modified organopolysiloxane is prepared by adding 90 parts of acrylonitrile, about 510 parts of butylacrylate, about 400 parts of an hydroxyl-terminated polydimethylsiloxane fluid (320 cs. at 25° C.) and about 5.98 parts of di-tert-butylperoxide to a stainless steel reactor. The mixture is heated to about 80° C. and agitated at about 320 r.p.m. for about 2.3 hours. The residual monomers are removed under a reduced pressure of about 1 mm. Hg. A reaction product is recovered which has a viscosity of about 6,600 cs. at 25° C.

About 100 parts of the modified organopolysiloxane prepared above are mixed with about 10 parts of "Celite" Super Floss, about 10 parts of zirconium silicate, 5 parts of zinc oxide, about 2 parts of methylhydrogenpolysiloxane fluid available as Dow Corning 1107), about 0.125 part of diphenyldiethoxysilane and about 0.125 part of methyltriethoxysilane and heated to about 120° C. for 1 hour. About 1.0 part of dibutyltin butoxychloride is incorporated therein with agitation and the flow property of the catalyzed composition measured in the flow jig.

In a comparison example, 0.4 part of butoxypolyoxyethylene polyoxypropylene glycol ("Ucon" 50–HB–260–X, available from Union Carbide Corporation) is incorporated in the above composition prior to the catalyst addition. A substantial improvement in the flow property of the resulting composition is observed upon addition of the butoxypolyoxyethylene polyoxypropylene glycol.

Although specific examples of the invention have been described herein, it is not intended to limit the invention solely thereto but to include all variations and modifications falling within the spirit and scope of the appended claims.

What is claimed is:

1. A cured composition which is obtained by admixing a hydroxyl-terminated organopolysiloxane fluid having a viscosity of at least 500 cs. at 25° C., a mixture of cross-linking agents containing from 95 to 50 percent by weight based on the total weight of the cross-linking agents of an organohydrogenpolysiloxane and from 5 to 50 percent by weight based on the total weight of the cross-linking agents of an organosilicon compound selected from the group consisting of silanes of the formula:

and siloxane derivatives thereof, wherein R is a hydrocarbon group having from 1 to 10 carbon atoms, R' is selected from the group consisting of monovalent hydrocarbon radicals and halogenated monovalent hydrocarbon radicals having up to 10 carbon atoms and $m$ is a number greater than 0 and up to 3, an organotin catalyst and from 0.1 to about 5.0 percent by weight based on the weight of the composition of an additive selected from the group consisting of long-chain organic acids having at least 14 carbon atoms, salts of organic and inorganic acids and nonionic compounds which have a polyoxyalkylene moiety of the formula:

$$-(CHR'''-CH_2-O-)_z$$

in which R''' is selected from the group consisting of hydrogen and a lower alkyl group and $z$ is an integer of from 2 to 50.

2. The composition of claim 1 wherein the organosilicon compound is a mixture of a diorganodialkoxysilane and a monoorganotrialkoxysilane.

3. The composition of claim 2 wherein the diorganodialkoxysilane is diphenyldiethoxysilane and the monoorganotrialkoxysilane is phenyltriethoxysilane.

4. The composition of claim 1 wherein the hydroxyl-terminated organopolysiloxane may be represented by the formula HO—Q—H wherein Q represents a siloxane of the formula

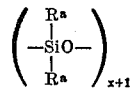

wherein $R^a$ is selected from the group consisting of monovalent hydrocarbon radicals, halogenated monovalent hydrocarbon radicals and cyanoalkyl radicals and $x$ is a number of from 0 to 20,000.

5. The composition of claim 1 wherein the hydroxyl-terminated organopolysiloxane may be represented by the formula HO—Q—H wherein Q represents a siloxane of the formula

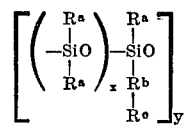

wherein $R^a$ is selected from the group consisting of monovalent hydrocarbon radicals, halogenated monovalent hydrocarbon radicals and cyanoalkyl radicals, $R^b$ is a divalent hydrocarbon radical, $R^c$ is a polymeric organic radical linked to $R^b$ by a carbon-to-carbon bond; $x$ is a number of from 0 to 20,000 and $y$ is a number of from 1 to 500.

6. The composition of claim 1 wherein the organotin catalyst is represented by the formula

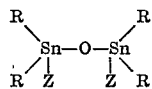

wherein R is a hydrocarbon radical having from 1 to 10 carbon atoms and Z is an acyloxy radical having from 2 to 18 carbon atoms.

7. The composition of claim 1 wherein the tin catalyst is dibutyltin butoxychloride.

8. The composition of claim 1 wherein the additive is selected from the class consisting of monoalkyl and alkaryl ethers of polyalkylene glycols, esters of polyalkylene glycols, esterified polyols, phosphonates and polyethersiloxanes.

9. The composition of claim 8 wherein the additive is monoalkyl and alkaryl ethers of polyalkylene glycols of the general formula R''''(OCHR'''—CH$_2$)$_z$OH in which R'''' is an alkyl radical of from 4 to 22 carbon atoms, R''' is selected from the group consisting of hydrogen and lower alkyl radicals and z is an integer of from 2 to 50.

10. The composition of claim 9 wherein the additive is polyoxyethylene (10) cetyl ether.

11. The composition of claim 8 wherein the additive is an ester of polyalkylene glycol of the formula R''''CO(OCHR'''—CH$_2$)$_z$OH in which R'''' is an alkyl radical of from 4 to 22 carbon atoms, R''' is selected from the group consisting of hydrogen and lower alkyl radicals and z is an integer of from 2 to 50.

12. The composition of claim 8 wherein the esterified polyol is polyoxyethylene sorbitan monooleate.

13. The composition of claim 1 wherein the organohydrogenpolysiloxane may be represented by the formula

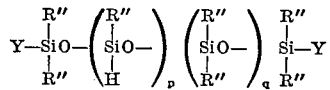

wherein R'' is selected from the group consisting of monovalent hydrocarbon radicals, halogenated monovalent hydrocarbon radicals and cyanoalkyl radicals, Y is selected from the group consisting of R, OH and OR in which R is a monovalent hydrocarbon radical and p is a number of at least 10 and q is a number which ranges from 0 to greater than p.

14. A method for preparing the composition of claim 1 which comprises mixing a hydroxyl-terminated organopolysiloxane fluid having a viscosity of at least 500 cs. at 25° C. with a mixture of cross-linking agents containing from 95 to 50 percent by weight based on the total weight of the cross-linking agents of an organohydrogenpolysiloxane and from 5 to 50 percent by weight based on the total weight of the cross-linking agents of an organosilicon compound selected from the group consisting of silanes of the formula:

R'$_m$Si(OR)$_{4-m}$ and siloxane derivatives thereof, wherein R is a monovalent hydrocarbon radical having from 1 to 10 carbon atoms, R' is selected from the group consisting of monovalent hydrocarbon radicals and halogenated monovalent hydrocarbon radicals having up to 10 carbon atoms and m is a number greater than 0 and up to 3, a filler and an additive selected from the group consisting of long-chain organic acids having at least 14 carbon atoms, salts of organic and inorganic acids and nonionic compounds which have a polyoxyalkylene moiety of the formula:

—(CHR'''—CH$_2$—O—)$_z$ in which R''' is selected from the group consisting of hydrogen and a lower alkyl group and z is an integer of from 2 to 50 and thereafter adding an organotin catalyst thereto with agitation.

References Cited
UNITED STATES PATENTS 3,677,996  7/1972  Kaiser et al. _____ 260—37 SB
3,393,164  7/1968  Braun _____ 260—37 SB LEWIS T. JACOBS, Primary Examiner U.S. Cl. X.R.

260—316, 33.2 SB, 37 SB